INVENTORS
EDWIN B. NOLT
& RICHARD R. EBY

Dec. 24, 1968   E. B. NOLT ET AL   3,418,014
KNOTTER CLAMP MEANS FOR BALER
Filed Aug. 16, 1967   5 Sheets-Sheet 3

INVENTORS
EDWIN B. NOLT
BY & RICHARD R. EBY

Dec. 24, 1968  E. B. NOLT ET AL  3,418,014
KNOTTER CLAMP MEANS FOR BALER
Filed Aug. 16, 1967  5 Sheets-Sheet 4

INVENTORS
EDWIN B. NOLT
& RICHARD R. EBY
BY

INVENTORS
EDWIN B. NOLT
& RICHARD R. EBY

United States Patent Office 3,418,014
Patented Dec. 24, 1968

3,418,014
KNOTTER CLAMP MEANS FOR BALER
Edwin B. Nolt, New Holland, and Richard R. Eby,
Ephrata, Pa., assignors to Sperry Rand Corporation, New Holland, Pa., a corporation of Delaware
Filed Aug. 16, 1967, Ser. No. 660,967
12 Claims. (Cl. 289—13)

ABSTRACT OF THE DISCLOSURE

Clamp means for twine in a knotter unit of a baler comprising relatively stationary and movable clamp members having complementary clamping surfaces, the movable clamp member being supported by a shaft rotatable and longitudinally movable through said stationary clamp member, said shaft having terminal means engaged directly by pressure mechanism operable to provide desired clamping movement upon the movable clamp member to urge it into engagement with the stationary clamp member independently of any driving means for said shaft and movable clamp member.

Background of the invention

Balers employing a plurality of strands of twine to tie a mass of material compressed into a completed bale include a knotter unit for each strand of twine which units function automatically and simultaneously to tie opposite ends of said strands into a tight knot. To accomplish this, the leading end of a strand of twine is secured in operative position by a part of complementary clamp members associated with each knotter unit, usually adjacent the upper surface of the bale being formed. As the bale forms, said strands of twine are extended around the bale until the desired size is reached, whereupon a pivoted needle which carries the remainder of the strand of twine from a continuous supply ball thereof operates to bring an elongated loop of said twine into engagement with the clamped end for the formation of a knot therewith. Severing of the tied strands from the remaining supply strands then takes place, the leading end of said supply strand remains threaded through an eye in the end of said needle, and said newly cut leading end of the strand for the next loop of twine to be formed then is clamped by said clamp members.

The knotter units immediately precede the clamp members in the knotter assembly and these function an instant ahead of actuation of one of said clamp members which is movable with respect to the other end for purposes of accomplishing a portion of the knot forming operation. The knotter unit as well as the movable clamp member are operated respectively by rotatable shafts to which relatively small gears are affixed, and a segmental gear, or otherwise, coacts with said small gears to effect rotation of the shafts of said knotter unit and movable clamp member.

In conventional knotter assemblies for balers of the type to which the present invention pertains, it has been customary to provide adequate pressure between the movable and stationary clamp members by applying longitudinal force against the small gear on the shaft of the movable clamp member in a direction to exect the desired clamping pressure between the cooperating faces of the stationary and movable clamp members. Typical structures of this type are illustrated in prior Patents Nos. 512,762 to Stewart, dated 1894 and 615,815 to Dennis, dated 1898.

Exerting such pressure directly against the driving ears for said shaft of the movable clamp member has been found to result in undesirable pressure between the co-engaging small driving gear on said shaft and the segmental driving gear when the same are in engagement with each other, thus causing premature excessive wear upon the teeth of these gear members and requiring replacement of the same more often than would be necessary if other types of pressure means were utilized. Precise adjustment of said pressure also is not readily achieved.

Summary of the invention

It has been found that the aforementioned situation resulting in premature wear between the interengaging gear elements of conventional clamping mechanism in balers of the type described above may be overcome very effectively and also produce additional improvements in the operation of the clamping means associated with such knotter units as described above. These benefits are produced primarily by the provision of terminal means extending axially beyond the end of the shaft to which the movable clamp member is connected. An appropriate lever arrangement which preferably is of a composite nature is utilized to transmit pressure force provided by a rotatable cam, having a relief portion therein, to said terminal end of a shaft of said movable clamp member, in a direction axially inward to press the same toward the stationary clamp member of the clamping means.

The lever means preferably comprises a pivoted lever having a roller follower on the outer end which directly engages the cam surfaces of the rotatable cam. Supported by said pivoted lever is another lever which preferably is in the form of a bell crank which is pivotally connected to said first mentioned lever adjacent the pivoted end thereof. The bell crank has a lateral projection directly engaging the terminal extension of said shaft of the movable clamp member, while the opposite end of said bell crank is connected to yieldable means, preferably in the form of a compressible spring, which engages the pivoted lever adjacent the end thereof which supports the cam follower, whereby only yieldable pressure is transmitted from the cam means to the terminal end of said shaft of the movable clamp member.

Another improvement comprises the provision of a replaceable wear member on said lateral extension of the bell crank which engages the terminal end of said shaft of the movable clamp member and normally urges the same in the direction of the axis of said shaft. Said removable wear member is mounted upon said lateral projection of said bell crank by means of adjustable shims which are operable to produce adjustable pressure engagement of a high degree of precision between said pressure means and said shaft of the clamping means.

*Description of the preferred embodiments*

Figure 1:
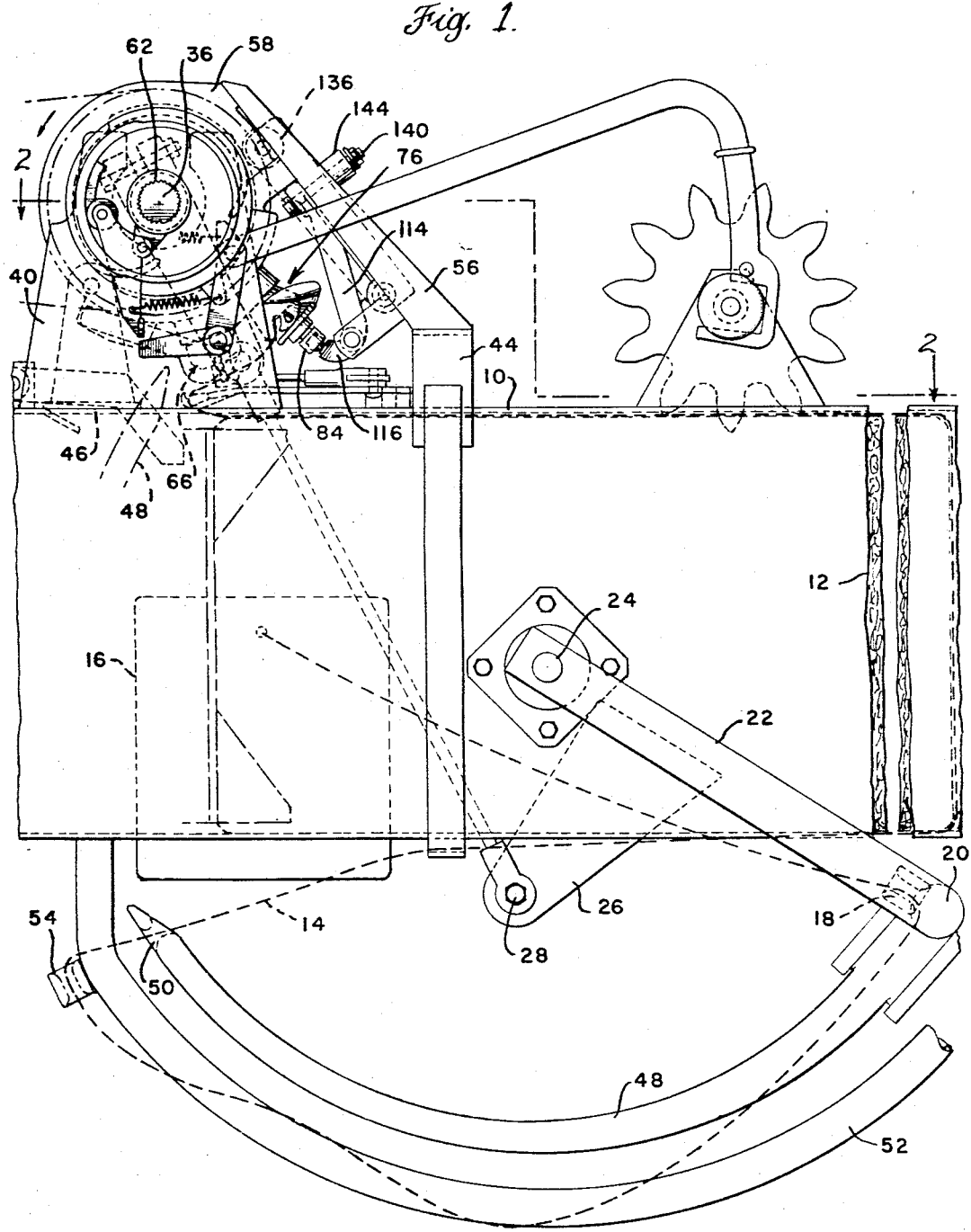
FIG. 1 is a fragmentary side elevation of the bale case portion of a baler upon which a knotter assembly is mounted for cooperative relation with an arcuate needle.

Referring to FIG. 1, a fragmentary portion of a horizontally extending bale case 10 is shown, part of the same being broken away to foreshorten the view. Especially in the broken portion, fragmentary parts of a bale 12 are illustrated in process of being formed and a somewhat diagrammatic outline of a strand of twine 14 is shown in dotted lines. Such twine extends from a container 16 in which a conventional ball of such twine is mounted for use. Said twine extends through a guide 18 supported by a transverse bar 20, the opposite ends of which are connected to a pair of radial arms 22, the opposite ends of which are connected to axially aligned pivots 24 fixed to the opposite sides of case 10 as best shown in FIG. 2.

Connected to and extending laterally from one of the arms 22 is an actuating ear 26. The outer end of said ear receives a pivot bolt 28 for purposes of pivotally connecting one end of connecting rod 30 thereto. The opposite end of connecting rod 30 is pivotally connected to a crank pin 32, see FIG. 2, mounted on the opposite end of crank arm 34 which is suitably keyed to drive shaft 36.

Figure 2:
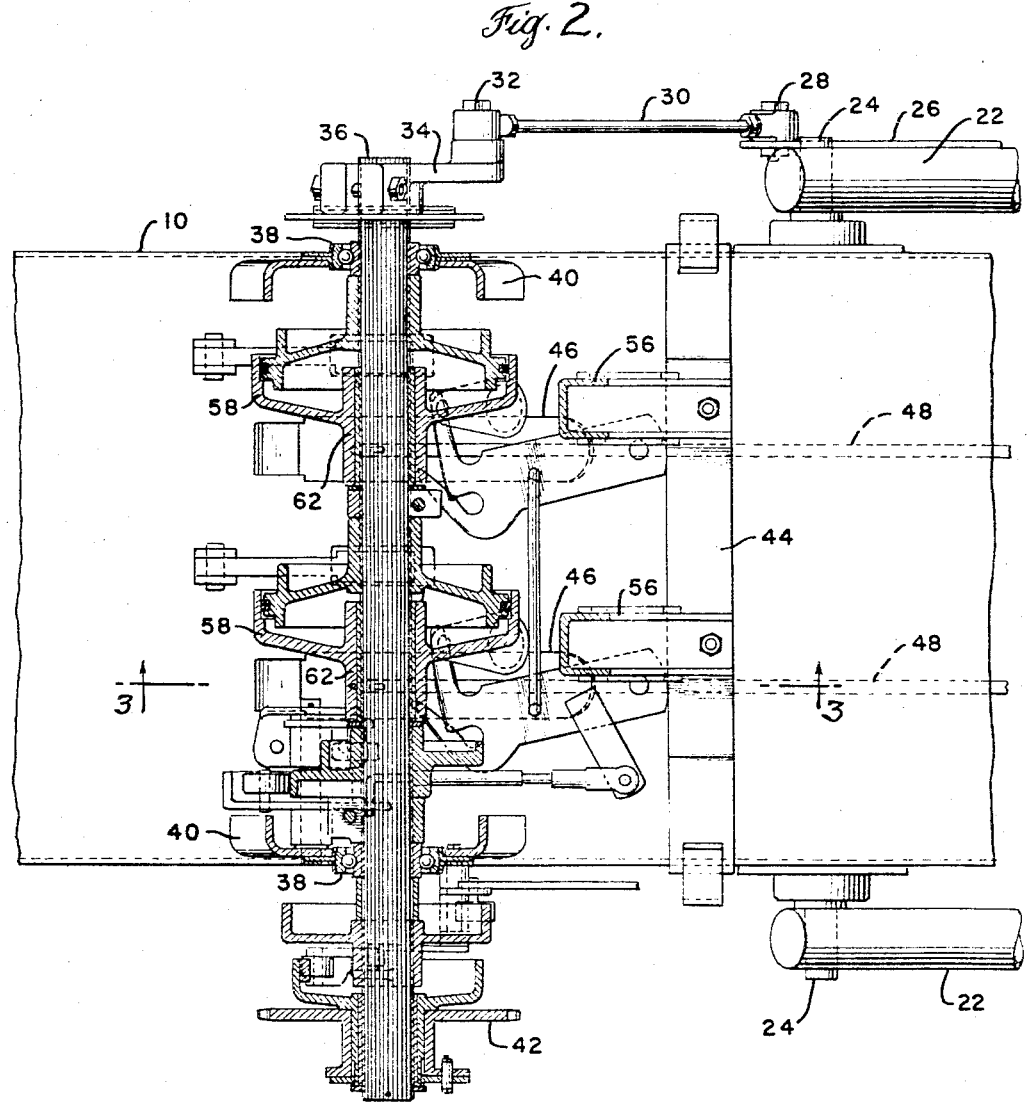
FIG. 2 is a top plan view of the mechanism shown in FIG. 1 as seen on the lines 2—2 of said figure.

Drive shaft 36 extends transversely across the top of case 10 as shown in FIG. 1 and, as illustrated in FIG. 2, opposite ends thereof respectively are supported in bearings 38 mounted in the upper portions of vertical brackets 40 which are fixed to and extend upward from the top wall of case 10. Drive shaft 36 is actuated by sprocket gear 42 which is interconnected to other drive means associated with the baler and not illustrated or described specifically herein.

Also fixed to the upper wall of case 10 is a mounting bar 44 which is adjacent a pair of transversely spaced slots 46 formed in the upper wall of case 10 which are respectively in longitudinal alignment with a pair of similarly spaced curved needles 48. Referring to FIG. 1, said needles are affixed at one end to the transverse bar 20 and the opposite end of each needle is provided with an eye 50 through which the twine 14 extends. Also referring to FIG. 1, it will be seen that extending from the lower wall of case 10, for each of the needles 48, is a curved guard 52 to protect the needle in use when travelling over a field. One of said guards also support an additional guide eye 54 shown in FIG. 1 through which the twine 14 also extends. In operation, the outer ends of the needles which contain the eye 50 project upwardly through the slots 46 incident to a strand of the twine 14 being tied around a bale by the knotter mechanism which will now be described in detail.

Figure 3:
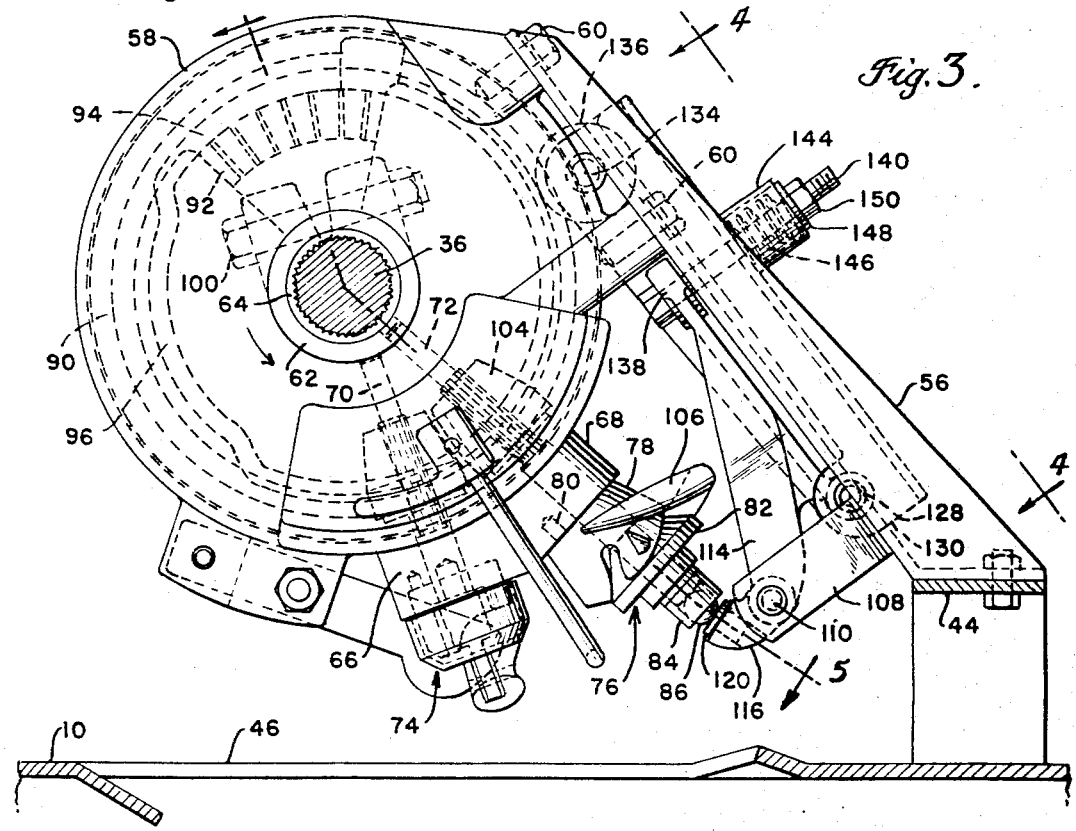
FIG. 3 is a vertical elevation of the mechanism shown in FIG. 2 as seen on the lines 3—3 of said figure.
Figure 4:
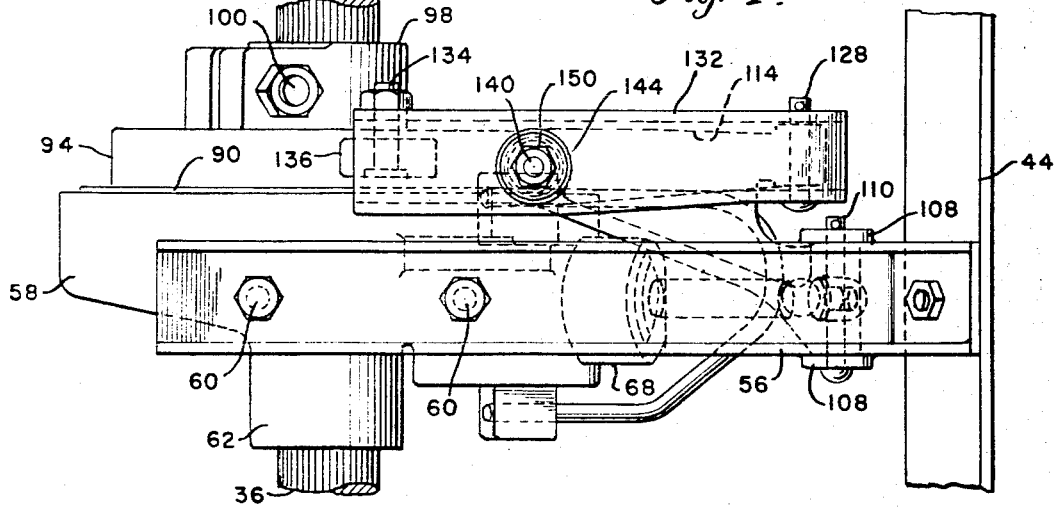
FIG. 4 is a fragmentary angular elevation of the mechanism shown in FIG. 3 as seen on the lines 4—4 of said figure.
Figure 5:
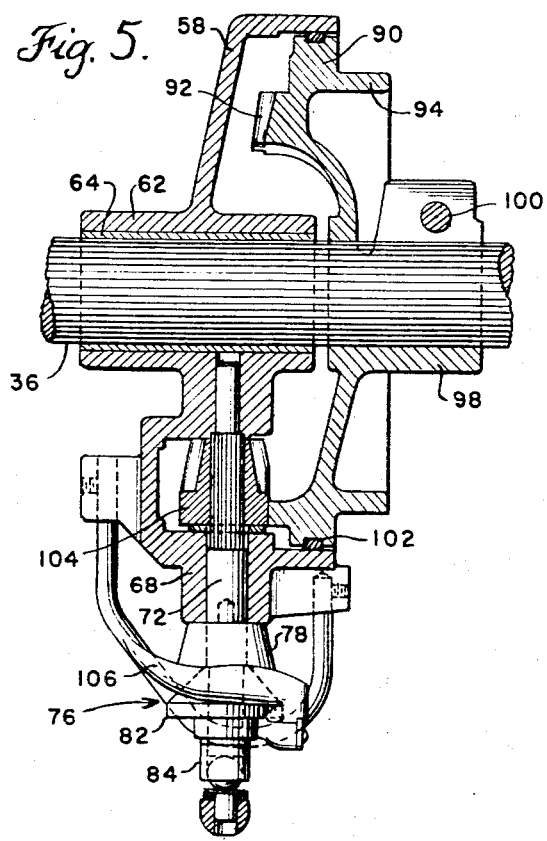
FIG. 5 is a fragmentary, vertical sectional elevation of the mechanism shown in FIG. 3 as seen on the lines 5—5 of said figure.

Extending angularly upward from the mounting bar 44 adjacent and partially overlying each of the slots 46 in the top of case 10 is a rigid arm 56. Connected to the outer end of each arm is a knotter frame casting 58 which is secured to the arm 56 by suitable bolts 60 such as shown in FIG. 3. Each of the castings 58 substantially comprises a housing which has a wall provided with a central bearing 62 within which, as best shown in FIGS. 2, 3 and 5, a cylindrical bearing sleeve 64 is rotatable. The inner surface of the sleeve 64 is complementary to the longitudinally splined exterior surface of shaft 36 so as to be keyed thereto.

Figure 6:
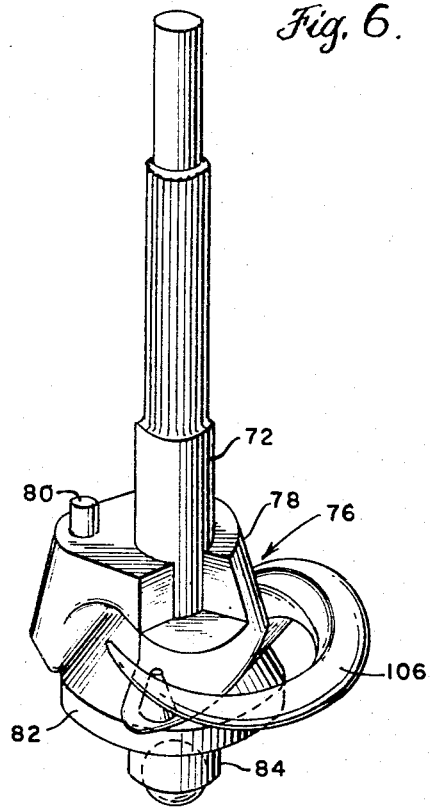
FIG. 6 is a perspective view of the stationary and movable clamp members mounted on a shaft therefor.

Referring particularly to FIG. 3, it will be seen that the housing casting 58 has a pair of radially extending bosses 66 and 68 projecting therefrom, the same having radially extending shaft receiving bores therethrough which accommodate the shafts 70 and 72 therein. The shaft 70 operates a knotter unit 74 which comprises the subject matter of Edwin B. Nolt's commonly owned copending application, Ser. No. 633,496, filed Apr. 25, 1967 and to which attention is directed for further details. Shaft 72 is for purposes of supporting and operating a clamping unit 76 with which the present invention is substantially concerned. The shaft 72 of the clamping unit 76 extends through a stationary clamping member 78 which abuts the outer face of boss 68 and is held against rotation with respect thereto by a keying pin 80, see FIGS. 3, 5 and 6, which projects into a complementary recess formed in boss 68.

A movable clamping member 82 is fixed to shaft 72 adjacent the outer end thereof. Terminal means 84 are interconnected to the outer end of shaft 72, preferably fixedly. In the particular arrangement shown in FIG. 7, such terminal means comprises a short sleeve which is welded to the terminal end of shaft 72 and thus forms an abutment for the movable clamp member 82 which is also preferably fixed to said shaft. If desired, the same weldment which secures terminal member 84 to a shaft also may be utilized to secure the clamping member 82 fixedly thereto. Otherwise, appropriate key means may be utilized to prevent relative rotation between clamp member 82 and shaft 72.

The short sleeve 84 comprising the exemplary terminal member also comprises a socket receiving anti-friction member 86 comprising a spherical ball of hardened steel or the like which may readily be retained within such socket by forming a plurality of circumferentially spaced peened indentations 88 in the outer end of the tubular member 84 to prevent escape of the spherical antifriction member 86 therefrom. Otherwise, if desired, the terminal or outer end of movable clamp members 82, as viewed in FIG. 7, may be formed with an integral, axially extending projection, not shown, preferably having a rounded terminal end thereon which will serve similarly to the antifriction member 86.

Particularly from FIG. 5, it will be seen that the knotter frame casting 58 is somewhat cup-shaped and the outer, open face thereof is closed by an irregularly shaped circular member 90 which serves the dual purpose of a support for segmental gear 92 which projects from one face of member 90, while the opposite face thereof supports an axially extending external cam 94, for purposes to be described. As viewed in FIG. 3 however, it will be seen that said cam has a relieved portion 96 extending around a portion of the periphery thereof, also for purposes to be described. Circular member 90 has a hub 98 which is clamped to the shaft 36 and preferably is locked in position thereon by a clamping bolt 100 which extends between a pair of appropriate ears projecting radially from a radial split in the hub as best shown in FIG. 3. The member 90 is rotated by shaft 36 within casting 58 and an annular seal 102 preferably is provided in the rim thereof to prevent ingress to the interior of the cup-shaped frame casting 58.

From FIG. 5, it also will be seen that the shaft 72, intermediately of the ends thereof, is externally splined preferably continuously around its circumference for purposes of receiving thereon a conical gear 104 which is of relatively small diameter and is complementary to the segmental gear 92, by which it is driven for a complete revolution incident to the tying of an individual knot in the twine 14 at the completion of the formation of a bale 12. Such operation is in conjunction with the functioning of the knotter unit 66, particularly for purposes of rotating the somewhat spirally curved twine guide hook 106 which is fixed to the periphery of movable clamp member 82. The length of the segmental gear 92 is adequate to effect said single revolution of shaft 72 and gear 104 thereon which operates to rotate the movable clamping member 82 and guide hook 106 thereon a corresponding single revolution.

When a knot has been tied in a strand of twine which encircles the completed bale, it is necessary to release the clamped leading end of that particular strand of twine which meanwhile has been clamped securely between clamp members 78 and 82, particularly during the time when the bale 12 which has been formed is progressively moving outwardly toward the discharge end of case 10. During such time, the strand 14 has been extending progressively around the bale until, as described hereinabove, the size of the bale has reached a desired predetermined limit and the needle 48 moves upwardly to twine tying position which actually is a position advanced beyond the fragmentary illustration of the outer end of needle 48 shown in FIG. 1.

Pressure relieving mechanism, which permits separation of the movable clamp member 82 in an axial direction from the stationary clamp member 78, is provided for purposes of interrupting the function of the pressure means which, meanwhile, has been operating to maintain the complementary clamping surfaces of clamp members 78 and 82, preferably yieldably, in clamping engagement with respect to each other to secure said leading end of a strand of twine therebetween. Description of the details of said pressure means as well as the operation of said releasing means for the pressure means will now be set forth.

Figure 9:
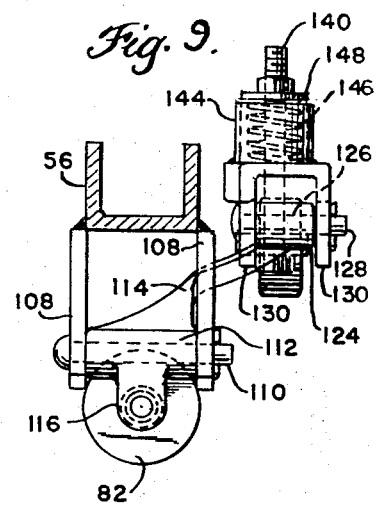
FIG. 9 is a transverse sectional view of the mechanism shown in FIG. 8 as seen on the lines 9—9 thereof.

A pair of parallel supporting ears 108 are fixed to opposite sides of rigid arm 56 which, as shown in FIG. 9, preferably is channel shaped. Extending between the outer ends of arms 108 is a pivot pin 110. One terminal leg 112 of a bell crank 114 of somewhat irregular shape is provided with a transverse bearing aperture through which the pivot pin 110 extends to pivotally connect the bell crank 114 to the stationary ears 108. Terminal legs 112 also terminate in a lateral extension 116 which is provided with a bore 118, shown in detail in FIG. 7, into which the supporting pin of a wear member 120 tightly fits. The area of the head of the wear member 120 is substantially coextensive with the supporting face of the lateral extension 116, as clearly shown in FIG. 7.

Figure 7:
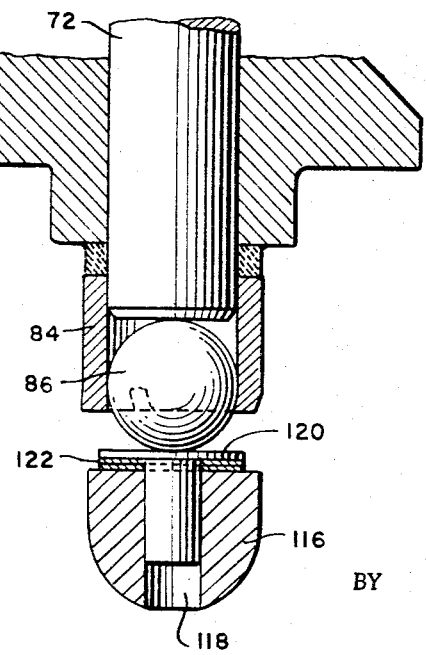
FIG. 7 is a fragmentary vertical elevation, on a much larger scale than in the preceding figures, illustrating details of the pressure means of the invention.

In order to adjust the axial engagement of the wear member 120 with the terminal means 84 of shaft 72, and especially with the rounded member 86 which comprises the endmost portion thereof, suitable shim means 122 are provided between the lower face of wear member 120 and the upper face of lateral extension 116 as viewed in FIG. 7. The thickness of the shim means 122 may be adjusted by conventional means to provide the desired level for the upper, operative surface of wear member 120 with respect to the lowermost portion of the terminal means 84 of shaft 72, as determined by initial operation of the mechanism and suitable adjustment thereof.

Figure 8:
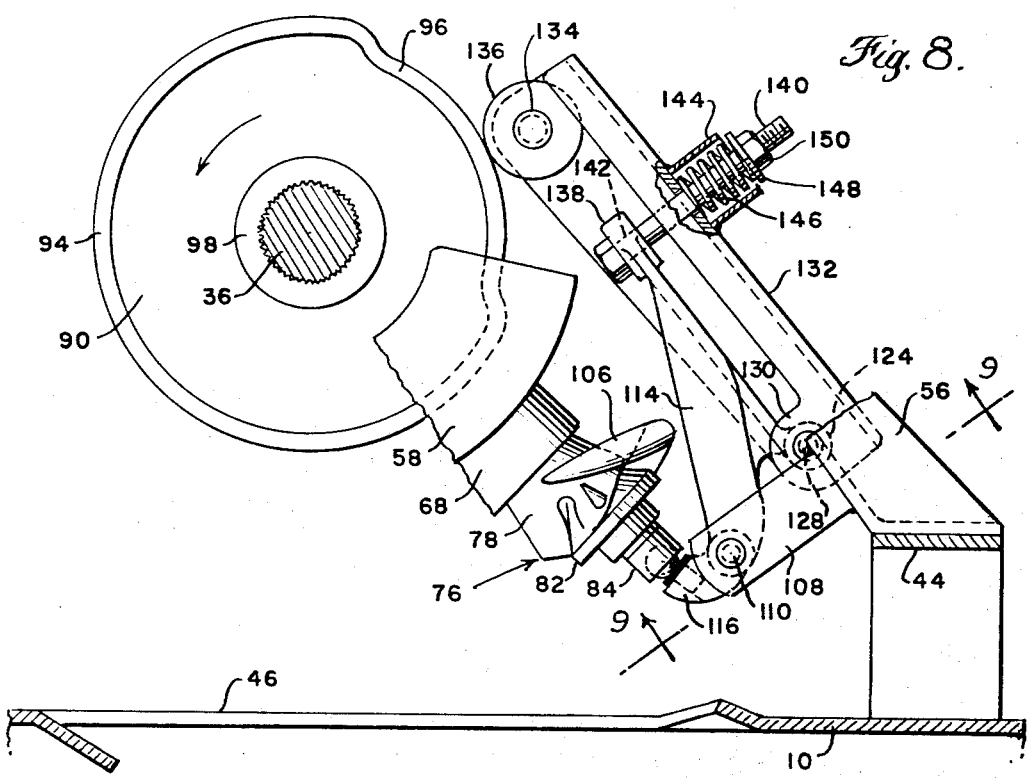
FIG. 8 is a fragmentary vertical elevation similar to FIG. 3 but in which certain of the supporting and actuating means have been removed as compared with FIG. 3 to simplify the illustration of the pressure and relief means of the mechanism.
Figure 10:
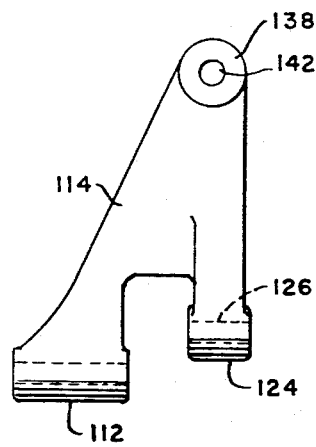
FIG. 10 is a plan view of a bell crank lever for the assemblies shown particularly in FIGS. 3 and 8.

Another leg 124 of the bell crank 114 is provided with a bearing opening 126 parallel to the bearing opening in terminal leg 112. The opening 126 receives another pivot pin 128 which extends through a pair of parallel ears 130 formed on the lower end of a pivoted lever 132 which is positioned adjacent one side of the rigid arm 56 as clearly shown in FIG. 9. Pivoted lever 134 also preferably is channel shaped but one side wall is narrower than the other as best shown in FIG. 8. Adjacent the upper end of the wider side wall, as viewed in FIG. 8, it will be seen that a headed pin 134 extends therethrough for purposes of rotatably supporting a cam follower roller 136 which is engageable with the cam 94, including the relief portion 96 thereof, during the rotation of said cam by said shaft 36.

The activating connection between pivoted arm 132 and the upper end 138 of bell crank 114, as illustrated in FIGS. 8 and 9, comprises a bolt 140 which extends through hole 142 formed in said upper end 138 of bell crank 114, the axis of which is perpendicular to the axes of the bearing openings in the terminal leg 112 and other leg 124 of bell crank 114. The bolt 140 also extends through a suitable hole of appropriate clearance formed in the outer wall of pivoted lever 132 as best shown in FIG. 8, the bolt then extending through a guard sleeve 144 of appropriate diameter to freely receive a compressible spring 146 which surrounds bolt 140.

A washer 148, through which bolt 140 also extends, abuts the outer end of spring 146 and an appropriate nut 150 is operable to regulate the compression of the spring 146 between said washer and the outer surface of pivoted lever 132. In view of such arrangement, movement of the follower roller 136 with respect to cam 94 is not transmitted rigidly to the lateral extension 116 and by it to the shaft 72. Instead, such motion is transmitted by roller 136 to pivot lever 132 and, through the resilience of spring 146, such motion is transmitted to the bell crank 114 and from it to the lateral extension 116 for transmission to the terminal means of shaft 72.

In view of such structure as described immediately hereinabove, it also will be seen that when the cam follower 136 engages the relieved portion 96 of cam 94, the pressure will be relieved upon the terminal means of shaft 72, whereby the movable clamp member 82 may move away from stationary clamp member 78 and thereby release the end of the strand of twine which has been clamped between the complementary gripping surfaces of said clamp members. Also, due to the replaceable wear member 120 which is subjected to extensive wear in the normal operation of the baler, it is only necessary to replace a relatively inexpensive item when the member 120 is worn beyond further use. In addition, precise adjustment of the level of the exterior surface of wear member 120 with respect to the terminal means of shaft 72 may be adjusted very precisely in view of the shim arrangement associated with wear member 120.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. Twine clamp means for a knotter unit of a baler utilizing a plurality of strands of twine to tie a bale of desired size, said twine clamp means comprising a pair of clamp members having opposed complementary clamping surfaces arranged to clamp a strand of twine therebetween during a tying cycle of the knotter unit, means to support one of said clamp members stationarily relative to said knotter unit, a rotatable shaft extending through said stationary clamp member and connected at one end to the other clamp member for rotation thereof relative to said stationary clamp member during a portion of said tying cycle, gear mechanism engaging said shaft and operable to rotate the same as aforesaid, pressure means interengaging said one end of said shaft outwardly from said other clamp member thereon and operable to urge the same into clamping engagement with said stationary clamp member, and releasing means for said pressure means operable to render said pressure means inoperable during a portion of said tying cycle to permit release of the end of said twine clamped between said clamp members.

2. The twine clamp means according to claim 1 in which said rotatable shaft is provided with terminal means extending beyond said other clamp member supported thereby and said pressure means for said shaft being provided with means thereon engaging said terminal means of said shaft.

2. The twine clamp means according to claim 2 in which said pressure means comprises a lever provided with an actuating portion interengaging said shaft and mounted for movement coaxially therewith.

4. The twine clamp means according to claim 3 in which said actuating portion of said lever further includes a replaceable wear member directly engageable with said terminal means of said shaft.

5. The twine clamp means according to claim 4 further including shim means between said replaceable wear member and said actuating portion of said pressure lever means, whereby the pressure exerted by said replaceable wear member upon said terminal means of said shaft may be adjusted to a highly precise degree.

6. The twine clamp means according to claim 3 in which said actuating portion of said lever comprises a projection extending laterally therefrom and comprising said actuating portion, said lateral projection having a face abutting said terminal means of said shaft to apply pressure thereto.

7. The twine clamp means according to claim 6 in which said lever is a bell crank, said clamp means further including yieldable means engaging a portion of said bell crank and operable to effect yieldable contact of said face of said projection with said terminal means of said shaft.

8. The twine clamp means according to claim 6 further including a cam arranged to be movably driven for interengagement with a portion of said bell crank, said cam having a relief portion and a cam follower being interconnected to said lever and engageable with said cam, said relief portion of said cam comprising said releasing means and being operable when said cam follower engages said relief portion to relieve the pressure of said pressure means against said movable clamp member to permit release of a strand of twine from between the complementary gripping surfaces of said clamp members.

9. The twine clamp means according to claim 8 further including a pivoted cam follower lever and means interconnecting a portion of said bell crank to the same for support thereby, and additional means rotatably supporting said cam follower for engagement with said cam.

10. The twine clamp means according to claim 9 further including a yieldable spring positioned between one end of said bell crank and said cam follower lever and operable to provide yieldable pressure of said lateral projection upon said bell crank against said terminal means of said shaft.

11. The twine clamp means according to claim 1 further including yieldable means interconnected to said pressure means and operable to effect yielding engagement of said movable clamp member with respect to said stationary clamp member to clamp a strand of twine therebetween.

12. The twine clamp means according to claim 1 in which said pressure means is provided with a replaceable wear member which interengages said one end of said shaft, and said wear member also including adjustable means between said wear means and said pressure means to provide precise desired contact therebetween.

References Cited
UNITED STATES PATENTS

| | | | |
|---|---|---|---|
| 1,155,860 | 10/1915 | Loitte | 289—13 |
| 1,529,914 | 3/1925 | Prochazka | 289—13 |
| 2,716,035 | 8/1955 | Thorndike | 289—13 |

LOUIS K. RIMRODT, *Primary Examiner.*